(12) United States Patent
Shechtman et al.

(10) Patent No.: US 8,861,869 B2
(45) Date of Patent: Oct. 14, 2014

(54) DETERMINING CORRESPONDENCE BETWEEN IMAGE REGIONS

(71) Applicant: Adobe Systems Incorporated, San Jose, CA (US)

(72) Inventors: Elya Shechtman, Seattle, WA (US); Daniel R. Goldman, Seattle, WA (US); Connelly Barnes, Corvallis, OR (US); Adam Finkelstein, Princeton, NJ (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/056,696

(22) Filed: Oct. 17, 2013

(65) Prior Publication Data

US 2014/0105499 A1 Apr. 17, 2014

Related U.S. Application Data

(63) Continuation of application No. 12/857,294, filed on Aug. 16, 2010, now Pat. No. 8,571,328.

(51) Int. Cl.
*G06K 9/68* (2006.01)
*G06T 7/00* (2006.01)
*G06K 9/62* (2006.01)

(52) U.S. Cl.
CPC .............. *G06T 7/0081* (2013.01); *G06T 7/003* (2013.01); *G06K 2009/6213* (2013.01); *G06K 9/6211* (2013.01); *G06T 7/0097* (2013.01)
USPC ........................................................ 382/218

(58) Field of Classification Search
USPC .......................................... 382/209, 217–222
See application file for complete search history.

(56) References Cited

U.S. PATENT DOCUMENTS

| | | | |
|---|---|---|---|
| 6,018,592 A | 1/2000 | Shinagawa et al. | |
| 6,263,088 B1 | 7/2001 | Crabtree et al. | |
| 6,347,152 B1 | 2/2002 | Shinagawa et al. | |
| 6,987,520 B2 | 1/2006 | Criminisi et al. | |
| 7,088,870 B2 | 8/2006 | Perez et al. | |
| 7,336,851 B1 | 2/2008 | Cote | |
| 7,760,912 B2 | 7/2010 | Dana et al. | |
| 7,773,099 B2 | 8/2010 | Forlines et al. | |
| 7,826,683 B2 | 11/2010 | Phillips | |
| 8,139,850 B2 | 3/2012 | Maxwell et al. | |
| 8,139,867 B2 | 3/2012 | Maxwell et al. | |
| 8,285,055 B1 | 10/2012 | Barnes | |
| 8,571,328 B2 | 10/2013 | Shechtman et al. | |
| 8,660,305 B2 * | 2/2014 | Herling et al. ................ | 382/103 |

(Continued)

OTHER PUBLICATIONS

"Creative Commons", retrieved from <http:/__/web.archive.org/web/20__100130095204/http:/creativecommons.org/> on Feb. 1, 2012, (2010), 3 pages.

(Continued)

*Primary Examiner* — Aaron W Carter
(74) *Attorney, Agent, or Firm* — Wolfe-SBMC (57) ABSTRACT

Techniques for determining correspondence between image regions are described. A computing system stores images that are comparable to determine corresponding image patches of the images. An approximation algorithm is implemented, and for multiple image patches in a region in a first image, corresponding image patches are determined in a second image. The approximation algorithm performs iterations utilizing a nearby-pixel mapping evaluation and a random-perturbation mapping evaluation to determine and select the corresponding image patches in the second image.

20 Claims, 5 Drawing Sheets

(56) References Cited

U.S. PATENT DOCUMENTS

| | | |
|---|---|---|
| 2003/0099406 A1 | 5/2003 | Georgiev et al. |
| 2004/0164996 A1 | 8/2004 | Criminisi et al. |
| 2005/0128210 A1 | 6/2005 | Berger et al. |
| 2005/0128211 A1 | 6/2005 | Berger et al. |
| 2005/0220348 A1 | 10/2005 | Chiu et al. |
| 2006/0120624 A1 | 6/2006 | Jojic et al. |
| 2006/0284874 A1 | 12/2006 | Wilson |
| 2006/0285762 A1 | 12/2006 | Sun et al. |
| 2007/0025637 A1 | 2/2007 | Setlur et al. |
| 2008/0112642 A1 | 5/2008 | Matsushita et al. |
| 2008/0238942 A1 | 10/2008 | Sun et al. |
| 2008/0238945 A1 | 10/2008 | Wakizaka |
| 2008/0292162 A1 | 11/2008 | Gering et al. |
| 2009/0141992 A1 | 6/2009 | Coulombe et al. |
| 2009/0180713 A1 | 7/2009 | Bucha et al. |
| 2010/0183242 A1 | 7/2010 | Brand |
| 2010/0287511 A1 | 11/2010 | Meier et al. |
| 2010/0289817 A1 | 11/2010 | Meier et al. |
| 2010/0296748 A1* | 11/2010 | Shechtman et al. .......... 382/254 |
| 2010/0328352 A1 | 12/2010 | Shamir et al. |
| 2011/0182502 A1 | 7/2011 | Liang |
| 2013/0120454 A1* | 5/2013 | Shechtman et al. .......... 345/635 |
| 2013/0163874 A1 | 6/2013 | Schechtman et al. |

OTHER PUBLICATIONS

"Java (programming language)", retrieved from <httn://en.wikioedia.org/w/index.ohn?title= Java_(programming_language1&oldid=550214> on Feb. 1, 2012, (2002), 7 pages.

"Microsoft Research AutoCollage", retrieved from <http://research.microsoft.com/autocollage/> on Nov. 26, 2008, (2008), 2 pages.

"Open GL", Wikipedia, retrieved from <http://en.wikioedia.org/w/index.php?title=OpenGL&oldid=928I664> on Feb. 1, 2012, (Dec. 2004), 3 pages.

"phpFlickr Version 3.1", retrieved from <http://phpflickr.com/> on Jan. 26, 2012, (Jan. 2011), 4 pages.

Agarwala, et al., "Interactive digital photomontage", *ACM Transactions on Graphics (Proc. SIGGRAPH)*, 23(3), 294-302, 2004, 9 pages.

Arya, Sunil et al., "An optimal algorithm for approximate nearest neighbor searching in fixed dimensions", *Proc. Fifth Symp. Discrete Algorithms (SODA)*, (1994), 33 pages.

Ashikhmin, Michael "Synthesizing Natural Textures", *Proceedings of the Symposium on Interactive 3D Graphics 2001*, 10 pages.

Avidan, et al., "Seam Carving for Content-Aware Image Resizing", *ACM Transactions on Graphics 2007*, (Jul. 2007), 9 pages.

Baker, et al., "Limits on Superresolution and How to Break Them", *IEEE Transactions on Pattern Analysis and Machine Intelligence*, (Jan. 2002), 37 pages.

Barnes, Connelly et al., "PatchMatch: A Randomized Correspondence Algorithm for Structural Imaging Editing", *ACM SIGGRAPH 2009 Papers* (New Orleans, Louisiana, Aug. 3-7, 2009), 11 pages.

Barnes, Connelly et al., "Supplementary Material for the Generalized PatchMatch Correspondence Algorithm", retrieved from <ht1Q://www.cs.princeton.edu/gfx/nubs/Barnes_2010_TCiP/index.Qhp> on Sep. 9, 2010, 6 pages.

Barnes, et al., "A Randomized Algorithm for Nearest Neighbor Fields", (Sep. 8, 2008), 9 pages.

Barnes, et al., "The Generalized PatchMatch Correspondence Algorithm", *European Conference on Computer Vision*, Sep. 2010, Retrieved from <http://gfx.cs.princeton.edu/pubs/Barnes_2010_TGP/generalized_pm.pdf> on Sep. 9, 2010, 14 pages.

Bay, Herbert et al., "SURF: Speeded Up Robust Features", *Computer Vision and Image Understanding (CVIU)*, vol. 110, No. 3, (2008), 14 pages.

Bertalmio, Marcelo et al., "Image Inpainting", *SIGGRAPH '00: Proceedings of the 2ih annual conference on computer graphics and interactive techniques*, ACM Press/Addison-Wesley Publishing Co., New York, NY, USA, (2000), 8 pages.

Boiman, Oren et al., "In Defense of Nearest-Neighbor Based Image Classification", *Academic Paper*, The Weizmann Institute of Science, (Jun. 2008), 8 pages.

Bourdev, Lubomir et al., "Robust Object Detection via Soft Cascade", *Proceedings from CVPR 2005*, IEEE Computer Society, (2005), 8 pages.

Boykov, et al., "Fast Approximate Energy Minimization via Graph Cuts", *IEEE Transactions on Pattern Analysis and Machine Intelligence*, vol. 23, No. 11, (Nov. 2001), pp. 1-18.

Buades, et al., "A non-local algorithm for image denoising", Retrieved from <http://bengal.missouri.edu/~kes25c/nI2.pdf > on Nov. 28, 2012, (2005), 6 pages.

Chang, Hong et al., "Super-Resolution through Neighbor Embedding", *Computer Vision and Pattern Recognition*, 2004. CVPR 2004. Proceedings of the 2004 IEEE Computer Society Conference, (Jul. 2004), 8 pages.

Chen, Tao et al., "Sketch2Photo: Internet Image Montage", *ACM Transactions on Graphics (TOG)*—Proceedings of ACM SIGGRAPH Asia 2009, (Dec. 2009), 10 pages.

Cho, Taeg S., et al., "The Patch Transform and Its Applications to Image Editing", *Computer Vision and Pattern Recognition*, 2008. CVPR 2008. IEEE Conference on, (Jun. 23, 2008), 8 pages.

Criminisi, A. "Region Filling and Object Removal by Exemplar-Based Image Inpainting", *IEEE Transactions on Image Processing*, vol. 13, No. 9, (Sep. 2004),13 pages.

Criminisi, et al., "Object Removal by Exemplar-Based Inpainting", *IEEE Conference on Computer Vision and Pattern Recognition*, pp. 417-424, (2003), 8 pages.

Dale, Kevin et al., "Image Restoration Using Online Photo Collections", *Proceedings of IEEE Conference on Computer Vision*, (Sep. 2009), 8 pages.

Datar, Mayur et al., "Locality-Sensitive Hashing Scheme Based on p-Stable Distributions", In Proceedings of SCG 2004,(Jun. 2004), pp. 253-262.

Drori, et al., "Fragment-Based image Completion", *Proceedings of ACM SIGGRAPH*, pp. 303-312, (2003), 10 pages.

Efros, Alexei A., et al., "Image Quilting for Texture Synthesis and Transfer", *SIGGRAPH 2001*, Computer Graphics Proceedings, ACM Press/ACM SIGGRAPH, E. Fiume, Ed.,, (2001), 6 pages.

Efros, et al., "Texture Synthesis by Non-parametric Sampling", Retrieved from <http://www.google.com/url?sa=t&rct=j&g=&esrc=s&source=web&cd=1&ved=0CDgQFjAA&url=http%3A%2F%2Fciteseerx.ist.psu.edu%2Fviewdoc%2Fdownload%3Fdoi%3D10.1.1.87.5386%26rep%3Drep1%26type%3Dpdf&ei=vee_UPHcDcjligKYv4GoBw&usg=AFQjCNFzcgUrhWMQAWsicicD, (Sep. 1999), 6 pages.

Eisemann, Martin et al., "Photo Zoom: High Resolution from Unordered Image Collections", *SIGGRAPH 2010*, Los Angeles, California, (May 2010),1 page.

Fischler, Martin A., et al., "Random sample consensus: a paradigm for model fitting with applications to image analysis and automated cartography", *Communications of the ACM*, 24(6):381-395, (Jun. 1981), pp. 381-395.

Fitzgibbon, et al., "Image-Based Rendering Using Image-Based Priors ", 2005, *International Journal of Computer Vision 63*, 2 (July), 141-151, (2005), 11 pages.

Freeman, William T., et al., "Example-Based Super-Resolution", *Computer Graphics and Applications*, IEEE 22, 2(Mar./Apr.), (Dec. 2001), 14 pages.

Freeman, William T., et al., "Learning Low-Level Vision", *International Journal of Computer Vision 40*, (2000), 47 pages.

Hacohen, et al., "Image Upsampling via texture Hallucination", Retrieved from <http://www.cs.huji.ac.il/~yoavhacohen/upsampling/upsampling.pdf> on Nov. 28, 2012, (Mar. 2010), 8 pages.

Han, Charles et al., "Multiscale Texture Synthesis", *ACM Transactions on Graphics*, vol. 27, No. 3, (Aug. 2008), 8 pages.

Hays, James et al., "Scene Completion Using Millions of Photographs", *ACM SIGGRAPH*, vol. 26, 4:1-4, (2007), 7 pages.

Hertzmann, Aaron et al., "Image Analogies", *Proceedings of SIGGRAPH 2001*, 14 pages.

(56) References Cited

OTHER PUBLICATIONS

Johnson, Micah K., et al., "CG2Real: Improving the Realism of Computer Generated images Using a Large Collection of Photographs", *IEEE Transactions on Visualization and Computer Graphics*, vol. 17, No. 6, (Sep. 2011), 13 pages.

Kaneva, Biliana et al., "Infinite Images: Creating and Exploring a Large Photorealistic Virtual Space", *Proceeding of the IEEE*, vol. 98, No. 8, (Aug. 2010),17 pages.

Kirkpatrick, S et al., "Optimization by Simulated Annealing", *Science*, vol. 220, No. 4598, (May 13, 1983), pp. 671-680.

Komodakis, Nikos et al., "Image Completion Using Efficient Belief Propagation via Priority Scheduling and Dynamic Pruning", *IEEE Transactions on Image Processing 16*, 11, (2007), 30 pages.

Kopf, Johannes et al., "Solid Texture Synthesis from 2D Exemplars", *ACM Transactions on Graphics (Proceedings of SIGGRAPH 2007)* 26, 3, 2:1-2:9, (2007), 9 pages.

Kumar, Necraj et al., "What is a Good Nearest Neighbors Algorithm for Finding Similar Patches in Images", *European Conference on Computer Vision, II*, (2008), 15 pages.

Kwatra, et al., "Texture Optimization for Example-based Synthesis", Retrieved from <http://physbam.stanford.edu/~kwatra/papers/TO/TO-final.pdf> on Nov. 28, 2012, (2005), 8 pages.

Kwatra, Vivek et al., "Graphcut Textures: Image and Video Synthesis Using Graph Cuts", *ACM Trans. Graph. 22* (2003), 3, 10 pages.

Lefebvre, Sylvain et al., "Parallel Controllable Texture Synthesis", *ACM Trans. Graph 24*, 3, (2005), 10 pages.

Liang, Lin et al., "Real-Time Texture Synthesis by Patch-Based Sampling", *ACM Trans. Graph. 20*, 3, (2001), 24 pages.

Lin, Yi et al., "Random Forests and Adaptive Nearest Neighbors", *Technical Report No. 1055*, retrieved from <www.stat.wisc.edu/Department/techreports/tr1081.pdf> on Sep. 7, 2010, (May 29, 2002), 31 pages.

Liu, Ce et al., "Face Hallucination: Theory and Practice", *International Journal of Computer Vision (IJCV)*, vol. 75, No. 1, (Oct. 2007), 34 pages.

Liu, et al., "Automatic Image Retargeting with Fisheye-View Warping", *ACM UIST*, pp. 153-162, (2005),10 pages.

Liu, Xueliang et al., "Video Collage", *MM '07*, Sep. 23-28, 2007, Augsburg, Bavaria, Germany, ACM, (Sep. 23, 2007), 2 pages.

Lowe, David G., "Object Recognition from Local Scale-Invariant Features", *Computer Vision*, 1999. The Proceedings of the Seventh IEEE International Conference, Kerkyra, Greece, (Sep. 1999), 8 pages.

Mikolajczyk, Krystian et al., "Improving Descriptors for Fast Tree Matching by Optimal Linear Projection", *International Conference on Computer Vision*, (2007), 8 pages.

Miranda, Abhilash A., et al., "New Routes from Minimal Approximation Error to Principal Components", *Neural Processing Letters*, vol. 27 No .3, (Jun. 2008),14 pages.

Mount, David M., et al., "ANN: A Library Searching for Approximate Nearest Neighbor Searching", *For Submission to the 2nd Annual Fall Workshop on Computational Geometry*, (Sep. 10, 1997), 2 pages.

Pandey, Sandeep et al., "Nearest-Neighbor Caching for Content-Match Applications", *International World Wide Web Conference Committee (IW3C2)*, Madrid, Spain, (Apr. 2009), pp. 441-450.

Pavic, Darko et al., "Interactive Image Completion with Perspective Correction", *The Visual Computer 22*, (2006),11 pages.

Peterson, James L., "Computer Programs for Detecting and Correcting Spelling Errors", *Computer Practices: Communications of the ACM*, vol. 23, No, 12, (Dec. 1980), pp. 676-687.

Rong, Guodong et al., "Jump Flooding in GPU with Applications to Voronoi Diagram and Distance Transform", *in/3D '06: Proceedings of the 2006 symposium on Interactive 3D graphics and games*, ACM, New York, NY, USA, (2006), 9 pages.

Rother, Carsten et al., "AutoCollage", *Proceedings of SIGGRAPH*, (Jul. 29, 2006), 6 pages.

Rother, Carsten et al., "Digital Tapestry", *IEEE Computer Vision and Pattern Recognition or CVPR, I*, (2005), 8 pages.

Rubinstein, et al., "Improved Seam Carving for Video Retargeting", *ACM Transactions on Graphics*, vol. 27, No. 3, Art. 16, (Aug. 2008), 9 pages.

Setlur, "Automatic Image Retargeting", *Mobile and Ubiquitous Multimedia (MUM)*, ACM Press, (2005), 1 page.

Shiratori, Takaaki et al., "Video Completion by Motion Field Transfer", *Computer Vision and Pattern Recognition*, 2006 IEEE Computer Society Conference on 1 (June), (2006), 8 pages.

Simakov, Denis et al., "Summarizing Visual Data Using Bidirectional Similarity", *In Proceedings of CVPR 2008*, (Jun. 23, 2008), 8 pages.

Snavely, Noah et al., "Photo Tourism: Exploring Photo Collections in 3D", *International Conference on Computer Graphics and Interactive Techniques*, Available at <http://phototour.cs.washington.edu/Photo_Tourism.pdf>,(Jul. 2006),12 pages.

Sun, et al., "Image Completion with Structure Propagation", *Proceedings of ACM SIGGRAPH*, pp. 861-868, (2005), 8 pages.

Tong, Xin et al., "Synthesis of Bidirectional Texture Functions on Arbitrary Surfaces", *inACM Transactions on Graphics 21*, 3, (Jul. 2002), 8 pages.

Tourapis, Alexis M., "Enhanced Predictive Zonal Search for Single and Multiple Frame Motion Estimation", *VCIP*, SPIE, C. C. J Kuo, Ed., vol. 4671 of Proceedings ofSPIE, 2002, pp. 1069-1079.

Wang, et al., "Optimized Sacale-and-Stretch for Image Resizing", *ACM Transactions on Graphics*, vol. 27, No. 5, Art. 118, (Dec. 2008), 8 pages.

Wang, Huamin et al., "Factoring Repeated Content within and Among Images", *ACM Trans. on Graphics (SIGGRAPH)*, vol. 27, No. 3, (Aug. 2008),10 pages.

Wang, Tang et al., "Video Collage: A Novel Presentation of Video Sequence", *IEEE*, ICME 2007, (2007), pp. 1479-1482.

Webb, "Nonlinear Discriminant Analysis- Projection Methods", *Chapter 6, Statistical Pattern Recognition*, (Jul. 2009), pp. 203-224.

Wei, Li-Yi et al., "Fast Texture Synthesis Using Tree-Structured Vector Quantization", *Proceedings of SIGGRAPH 2000*,10 pages.

Wei, Li-Yi et al., "Inverse Texture Synthesis", *ACM Trans. Graph 27*, 3, (2008),10 pages.

Wexler, et al., "Space-time Video Completion", *Computer Vision and Pattern Recognition*, IEEE Computer Society Conference on 1, (2004), 8 pages.

Wolf, et al., "Non-homogenous Content-driven Video-retargeting", *Proceedings of the 11th IEEE International Conference on Computer Vision*, (Oct. 14, 2007), pp. 1-7.

Yianilos, Peter N., "Data Structures and Algorithms for Nearest Neighbor Search in General Metric Spaces", *SODA*, NEC Research Institute, (1993),11 pages.

"Notice of Allowance", U.S. Appl. No. 12/857,294, Jun. 25, 2013, 8 pages.

"Non-Final Office Action", U.S. Appl. No. 12/857,294, Dec. 18, 2012, 9 pages.

Wexler, et al.,' "Space-Time Completion of Video", IEEE Transactions on Pattern Analysis and Machine Intelligence, vol. 29, No. 3, Mar. 2007, 14 pages.

\* cited by examiner

DETERMINING CORRESPONDENCE BETWEEN IMAGE REGIONS

RELATED APPLICATION

This application is a continuation of and claims priority to U.S. patent application Ser. No. 12/857,294 filed Aug. 16, 2010 entitled "Determining Correspondence Between Image Regions", the disclosure of which is incorporated by reference herein in its entirety.

GOVERNMENT RIGHTS

Funding for work described herein was provided in-part by the federal government through National Science Foundation Grant #CCF-0937139. The government has certain rights in the invention.

BACKGROUND

Image likeness, such as a correspondence between regions of one or more images, can be defined in many different implementations that depend on such correspondences. For example, this can include algorithms for correspondence in computer vision, such as wide baseline stereo matching and motion tracking, and graphics algorithms for image summarization, image completion, synthesizing textures, images and video, and others.

For example, a similarity score between images can be computed by a bidirectional similarity metric, which measures the distance from each patch in one image to the other image, and vice versa. A bidirectional similarity can be evaluated based on a patch distance metric. A bidirectional similarity computation can involve calculating nearest neighbor patches, which can be computationally demanding. Even with available approximation techniques, the bidirectional similarity calculation may not be quick enough for use in interactive applications for very large images. Moreover, approximation techniques may not be useable with certain distance metrics.

SUMMARY

The invention relates to determining correspondence between image regions.

In a first aspect, a computer-implemented method for determining correspondence between image regions includes selecting first and second regions of visual content including pixels in a computer system, the first region comprising a first patch to be mapped to the second region. The method includes performing iterations to find mappings for the first patch, the iterations including nearby-pixel mapping evaluation and random-perturbation mapping evaluation. The method includes recording second patches in the second region found using the iterations.

Implementations can include any or all of the following features. A heap reflecting patch distance from the first patch is used in the iterations to find the second patches, the heap corresponding to k patches, and the method further including determining whether a new patch from the iterations has a smaller patch distance from the first patch than one of the k patches that has a greatest patch distance in the heap; and if so, removing the patch that has the greatest patch distance from the heap, and adding the new patch to the heap. The method further includes: eliminating any duplicate patches from the k patches before determining patch distance. The random-perturbation mapping evaluation involves selecting n sample patches for each of the k patches in the heap, for a total of nk sample patches, the method further comprising: eliminating any duplicate patches from the nk sample patches before determining patch distance. The method further includes randomly selecting k patches in the second region for use in an initial one of the iterations. The method further includes: retaining all patches identified by the nearby-pixel mapping evaluation and the random-perturbation mapping evaluation; and recording, as the second patches, a subset of the retained patches having smallest patch distance.

The nearby-pixel mapping evaluation and the random-perturbation mapping evaluation are configured to result in a single patch being identified in the second region, and the method further includes: defining a constraint for each run of the nearby-pixel mapping evaluation and the random-perturbation mapping evaluation, the constraint prohibiting selection of a patch previously selected; retaining all patches identified by the nearby-pixel mapping evaluation and the random-perturbation mapping evaluation; and recording the retained patches as the second patches.

At least one evaluation selected from the nearby-pixel mapping evaluation and the random-perturbation mapping evaluation is performed on a different number of candidate patches than the second patches in at least one of the iterations. The method further includes: randomly selecting, before performing the evaluation, a subset from all candidate patches based on smaller patch distance, wherein the evaluation is performed on subset. The evaluation is performed on a greater number of candidate patches than the second patches.

The second region is identical to the first region. The method further includes: determining, in the iterations and for each patch in the first region, neighbor mappings to neighbor patches in the second region; determining, in the iterations and for each of the neighbors, neighbor's neighbor mappings to the first region; selecting a number of hops to make along the neighbor mappings and the neighbor's neighbor mappings; identifying, for each patch in the first region, third patches by sequentially following the neighbor mappings, and the neighbor's neighbor mappings, for the number of hops; and selecting the second patches for each patch in the first region among the corresponding third patches. The method further includes: determining, in the iterations and for each patch in the first region, neighbor mappings to neighbor patches in the second region; selecting a number of hops to make backwards along the neighbor mappings; identifying, for each patch in the first region, third patches by sequentially following the neighbor mappings backwards for the number of hops, the neighbor patches being included in the third patches; and selecting the second patches for each patch in the first region among the corresponding third patches.

The method further includes: horizontally dividing offsets generated by the iterations into tiles; and handling each tile using a separate core in a multi-core architecture of the computer system. The method further includes: constraining a writing of output from the nearby-pixel mapping evaluation with regard to updating of the tiles.

The method further includes: selecting an image descriptor for the first and second regions; and selecting a distance metric for evaluating mappings for the first patch; wherein the iterations use the selected image descriptor and the selected distance metric.

A warping action is performed on at least one of the second patches in at least one of the iterations.

In a second aspect, a system includes: a computer readable storage medium with visual content including pixels, the visual content including a first region with a first patch to be mapped to a second region in the visual content; a propagation component implemented in the computer readable storage medium and performing nearby-pixel mapping evaluation to find mappings for the first patch; and a random-search component implemented in the computer readable storage medium and performing random-perturbation mapping evaluation to find mappings for the first patch. The system stores in the computer readable storage medium second patches in the second region found by at least one of the propagation component and the random-search component.

In a third aspect, a computer-implemented method for determining correspondence between image regions includes: selecting an image descriptor for first and second regions in a computer system, the first region comprising a first patch to be mapped to the second region; selecting a distance metric for evaluating mappings for the first patch; performing iterations to find the mappings for the first patch, the iterations including nearby-pixel mapping evaluation and random-perturbation mapping evaluation, the iterations using the selected image descriptor and the selected distance metric; and recording at least one second patch in the second region found using the iterations.

Implementations can include any or all of the following features. Multiple second patches are found using the iterations and recorded. A warping action is performed on the second patch in at least one of the iterations.

In a fourth aspect, a computer-implemented method for determining correspondence between image regions includes: selecting first and second regions of visual content including pixels in a computer system, the first region comprising a first patch to be mapped to the second region; performing iterations to find mappings for the first patch, the iterations including nearby-pixel mapping evaluation and random-perturbation mapping evaluation, wherein a warping action is performed on second patches in the second region in at least one of the iterations; and recording at least one of the second patches found using the iterations.

Implementations can include any or all of the following features. The warping action includes at least one action selected from a rotation, a scaling, a transformation, a homography, and combinations thereof. Multiple second patches are found using the iterations and recorded. The method further includes: selecting an image descriptor for the first and second regions; and selecting a distance metric for evaluating the mappings for the first patch; wherein the iterations use the selected image descriptor and the selected distance metric.

In a fifth aspect, a computer-implemented method for determining correspondence between image regions includes: selecting first and second regions of visual content including pixels in a computer system, the first region comprising a first patch to be mapped to the second region; selecting at least two heuristics for use in mapping the first patch to the second region, the heuristics selected from the group consisting of: (i) nearby-pixel mapping evaluation; (ii) random-perturbation mapping evaluation; (iii) evaluation of multiple mapping candidates identified in an iterative search process; and (iv) enrichment to increase a collection of mapping candidates; and identifying, using the selected heuristics, at least one patch in the second region for the first patch.

One or more methods can be implemented using a computer program product tangibly embodied in a tangible program carrier, the computer program product comprising instructions that when executed by a processor perform the method(s).

Particular embodiments of the subject matter described in this specification can be implemented to realize one or more of the following advantages. In implementations involving object detection, denoising, or symmetry detection, for example, it can be useful to find not just a single (best) match but multiple (perhaps equally good) matches, and an arbitrary number of k candidates can therefore be detected for each patch in a matching algorithm. Arbitrary descriptors and/or distance functions can be used. Candidate patches can be found using warping, for example scaling and/or rotation.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
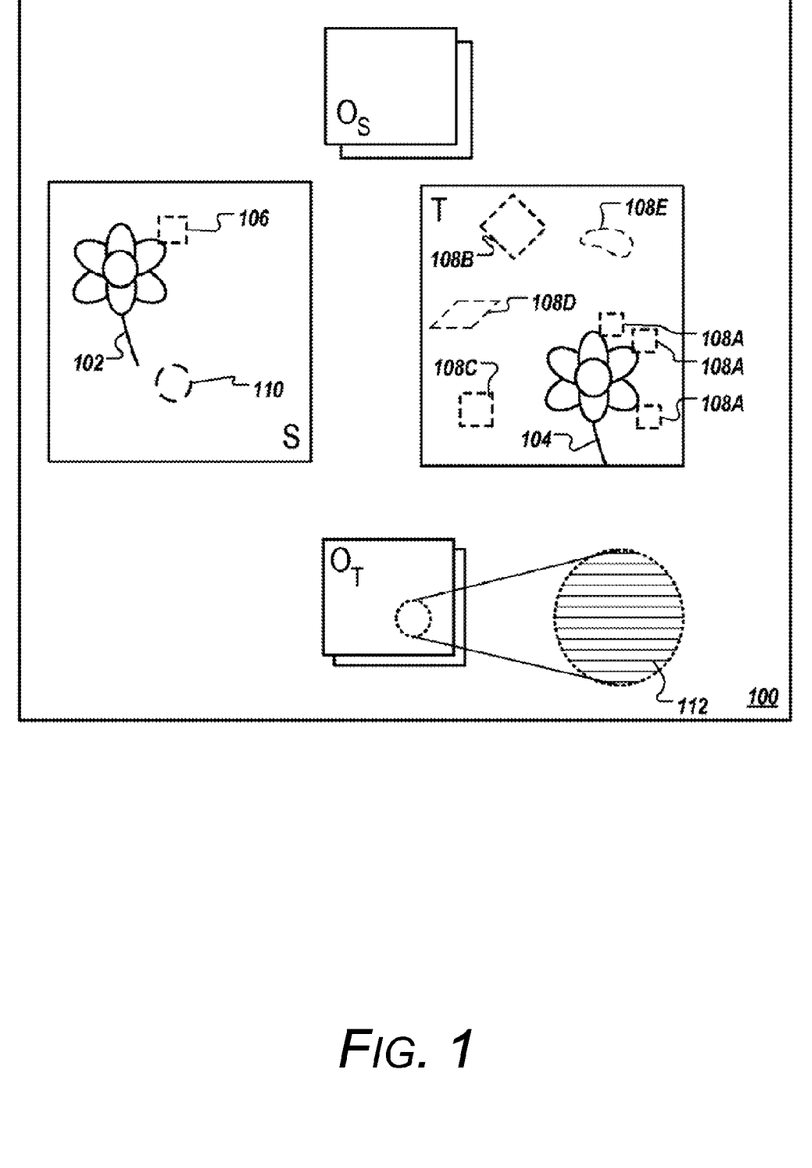
FIG. 1 schematically shows an example system that can determine a correspondence between image regions.

FIG. 1 schematically shows an example system 100 that can determine a correspondence between image regions. The system 100 can be implemented in any kind of processor-based device, such as a personal computer, a server device, a handheld device, a video system or a DVD player, to name just a few examples. For example, the system 100 can be implemented at least in part using a dedicated graphics processor, such as a graphics processing unit (GPU). In some implementations, the system 100 can be used to compute nearest-neighbor correspondences (e.g., a dense set of correspondences in form of a field) from one image region to another image region. Examples of nearest-neighbor identification, such as patch matching, are described in co-pending U.S. patent application Ser. No. 12/394,280, the entire contents of which are incorporated herein by reference.

A patch is a region in an image, of fixed or varying shape. For example patches could be defined as fixed-shape 5×5 or 7×7 rectangles. The methods and techniques described herein can be used in processing image contents for one or more purposes including, without limitation, to provide k nearest neighbors for an image patch, to search across rotations and scales, and to match arbitrarily selected descriptors. Some implementations are enhanced using acceleration techniques, such as an "enrichment" search strategy and/or a parallel algorithm for multi-core architectures. Implementations can involve processing of data organized in two or three dimensions, and/or a video image.

A first example involves determining correspondence between image regions. The system here includes images S and T stored in any of a number of different formats, such as a pixel-based format where the images S and T are made up of the same or different numbers of pixels. In some implementations, it may be useful to determine a correspondence between one or more regions of the image S and the image T. For example, it may be useful to determine whether for image content 102 (e.g., a flower) in the image S there is any corresponding image content 104 in the image T. As another example, the system 100 can be used to determine a correspondence between two or more regions of a single image, for example within the image S. Regions can include dense subsets of the total number of pixels that make up the entire image.

In some implementations, a goal is to find, for each of patch 106 in the image S, one or more corresponding patches 108A-C in the image T under a patch distance function. In some implementations, one can search over a space of offsets into the target image (e.g., the image T), rather than over the space of patches in the target image. For example, a notation can be used such that a patch P in the image S is defined as P=S(i,j), namely the patch in the image S having its upper left corner at column i and row j of the pixels in the image S. A patch T(k,l) in the image T can be similarly defined. In some implementations, an offset between patches S(i,j) and T(k,l) can be defined as (k−i, l−j). For example, if the two images S and T were identical, the best mapping from S to T when translation without warping is performed can be expressed as $$\arg\min_{k,l}(D[S(i,j),T(k,l)])=(k-i,l-j)$$

for all (i,j) and (k,l), where D is a patch distance function.

One or more offset objects $O_S$ and one or more offset objects $O_T$ can be defined. Here, $O_S$ is the current offsets (k−i, l−j) determined for all patches S(i,j). Similarly, $O_T$ is the current offsets (i−k, j−l) determined for all patches T(k,l). The offsets can be termed a nearest-neighbor field $f$ such that $f$: $\square^2 \mapsto \square^2$.

The nearest-neighbor field $f$ can be improved using a randomized patch-matching algorithm that is performed for a predefined number of iterations or until convergence. Initial offsets for all patches are defined as a starting point, and in each iteration the algorithm seeks to improve every offset using two sets of candidates: propagation candidates and random-search candidates. The propagation candidates for offset $f(x, y)$ are the known offsets above or to the left ($f(x-1, y)$ and $f(x, y-1)$). On alternating iterations, propagation can instead be done in reverse scan order, such that offsets below and to the right are examined. Generally, a propagation candidate that provides a smaller patch distance D should replace the current offset.

The random search can be performed to prevent the evaluation of propagation candidates from ending up in a local minimum. The random-search candidates are sampled from an exponential distribution relative to the current offset (e.g., offsets located at an exponentially decreasing distance from the current offset in a random direction). The current offset is replaced if the random-search candidate has a smaller patch distance D.

For problems such as denoising, symmetry detection, and object and clone detection, to name just a few examples, one may wish to compute more than a single nearest neighbor for every (i,j) position. A patch matching algorithm can be created to collect k nearest neighbors for each patch. For example, three patches 108A are here shown as candidates for the patch 106.

Multiple candidates can be found in various ways. Some implementations use an algorithm designed to find a single nearest-neighbor for each patch, such as the function $f$ in the above example. For example, the k best matches found by the single-neighbor algorithm can be retained. As another example, the single-neighbor algorithm can be run k times, with each run constrained so that offsets cannot be equal to any of the previously chosen offsets.

If multiple offset candidates are established for a patch in S, they can be registered in respective ones of multiple offset objects $O_S$. For example, k offset objects can be used to store k offset candidates for each patch. In another implementation, a single multidimensional offset object can store all k candidates for each patch.

In some implementations, the offsets can be stored in images of the same size as the images S and T. For example, a pixel $O_S(i,j)$ contains the current offset (k−i, l−j) such that the corresponding patch Q in the image T is found at coordinate (k,l). In some implementations, the algorithm can proceed by iteratively improving the estimates $O_S$ and $O_T$ so that they approach $$\min_{Q \in T} D(P,Q) \text{ and } \min_{P \in S} D(Q,P) \text{ in the limit.}$$

Any distance function can be used. Some implementations can use common distance functions for natural images and/or other data sources including video and three-dimensional shapes, such as an $L_p$, $L_1$, or clamped $L_2$, etc., or any other scalar function.

When searching for similar image regions for a current patch, it may be desirable to search also for patches that after being warped are similar or identical to the current patch. In some implementations, the similarity search is first performed with the target patches in an unaltered (i.e., not yet warped) state, and the candidate matches are registered. Thereafter, one or more warping actions are applied to the candidate matches and a search is performed for any patches which after being warped are similar to the current patch. Any type of warping can be used that allows parameterization over one or more warping parameters. In some implementations, the candidate patches can be warped using one or more warping actions of: rotation, scaling, transformation (e.g., affine or polar), homography, and combinations thereof. In some implementations, as another example, the candidate patches can remain unaltered (not warped), while instead the current patch is warped, before making a similarity measurement between the two registered patches.

As a first example of warping, arbitrary rotating and/or scaling can be performed in the process of seeking matching patches. In some implementations, rotating and/or scaling is used in applications such as object detection, denoising or super-resolution, where it may be desirable to match patches across a range of one or more possible warping actions, such as rotations and/or scales. For example, a patch 108B in T is here rotated around its center, a patch 108C in T is scaled, a patch 108D is transformed, and a patch 108E is warped, all compared to the other patches 108A.

To search a range of rotations $\theta \in [\theta_1, \theta_2]$ and a range of scales $s \in [s_1, s_2]$, a patch matching algorithm is created that has a search space of $(x,y,\theta,s)$. For example, this can be done by extending an algorithm that has the (x,y) search space with parameters for additional search dimensions. That is, the matching algorithm can be characterized as a function $f$ such that $f$: $\square^2 \mapsto \square^4$.

The function $f$ can be initialized by uniformly sampling from the range of possible positions, orientations and scales. In the propagation phase, the relative offsets between pixels $(\Delta_x, \Delta_y)$ can be transformed using a transformation matrix $T(\theta,s)$. In the random search phase, a sampling window of exponentially decreasing size can be used, and all four dimensions of the search space can be contracted around the current state.

Similarly, when using any other warping action(s) on the patches, the patch matching algorithm can be defined to have a search space that includes one or more dimensions for the corresponding warping parameter(s). For example, when the warping involves affine transformation, the action can be parameterized in terms of a linear transformation (e.g., amount(s) of rotation, scaling or shear) and a translation (e.g., amount of shift). As another example, when the warped candidate patch is a homography of the unwarped candidate patch, then rotation and translation parameters are defined, optionally with one or more additional parameters, such as a camera projection matrix.

Any warping action can be represented by a warping object $W_S$ in analogy with the offset object Os mentioned above. That is, $W_S(i,j)$ can represent the warping action(s) currently associated with the patch at (i,j). Similarly, a warping object $W_T$ corresponds to the offset object $O_T$.

Figure 2A:
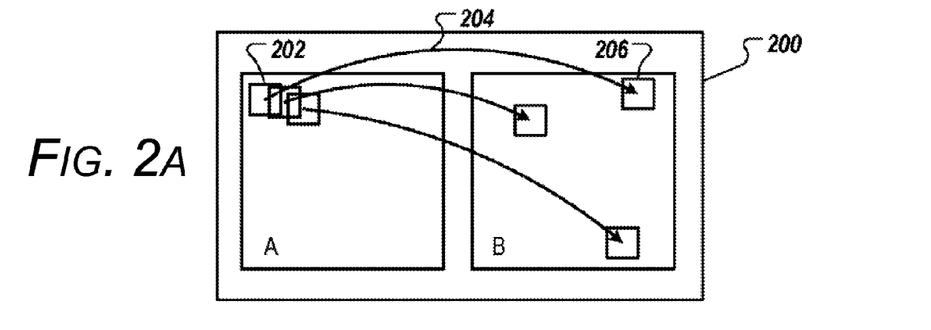
FIGS. 2A-2D show examples of mappings between image regions.

FIGS. 2A-2D show examples of mappings between image regions. In FIG. 2A, an image realm 200 includes images A and B. A patch 202 is located in a region of the image A. The patch 202 is associated with one or more mappings 204 to another image region. In some situations, this mapping represents an initial guess of what image region(s) best correspond to the patch 202, for example using the offset vectors mentioned above. For example, the other image region(s) can be located in the image B, such as the region(s) represented by one or more patches 206. The patch(es) 206 can correspond to any or all of the patches 108A-C discussed above; that is, the patch(es) 206 can include a rotated patch (cf. patch 108B), a scaled patch (cf. patch 108C), a non-rotated and non-scaled patch (cf. patch 108A), or combinations thereof. Each patch in the image A can have one or more mappings associated with it. A mapping can be improved in one or more iterations, for example as will now be described.

Figure 2B:
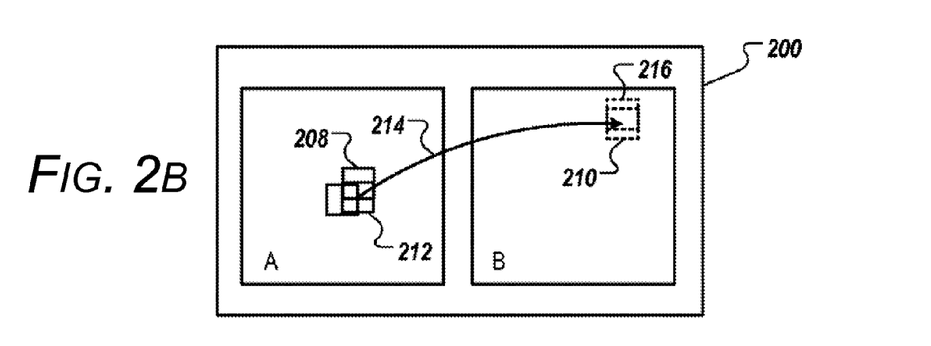

In some implementations, a propagation phase can be carried out as schematically illustrated in FIG. 2B. For example, assume that a patch 208 in the image A has been mapped to one or more patches 210 in the image B, the mapping(s) not shown in the figure for clarity. Neighbors of the patch 208 can now be evaluated to determine what mappings they have, and whether any of these mappings can be applied to the patch 208 for a better result. In some implementations, the offset vectors mentioned above can be used. For example, the algorithm can look at the offset vectors of neighboring or nearby patches, and use one of these offset vectors if it provides a better result. In some implementations, an algorithm can look at the four immediately adjacent pixels, or all pixels in a circular or square neighborhood of diameter 2 or 4, and/or any subset of the pixels within a fixed distance of the pixel at which propagation occurs, to name just a few examples. Here, for example, it may be determined that if one applies the mapping of a patch 212, then the patch 208 can be provided with a mapping 214 to a patch 216, which has a better correspondence to the patch 208 than the earlier mapping to the patch 210. The term propagation indicates that good mappings for one patch can be propagated to neighboring patches to improve their mappings. Thus, for example, if a local maximum of correspondence exists in mappings of a neighborhood around the patch 208, it can be detected in the propagation phase.

In implementations that identify k offsets as possible matches for a patch, these k offsets can all be taken into account in the propagation phase. In some implementations, the k offsets are ranked with regard to patch distance (e.g., as determined using any distance metric). For example, the offset object S or T (FIG. 1) can include, or can be included in, a max-heap. When a new candidate offset for an arbitrary patch (x,y) is identified in the propagation phase, it is compared to the "worst" offset in the max-heap (i.e., the one of the identified offsets having the greatest patch distance). If the candidate offset's patch distance is "better" than the worst offset (i.e., it has less patch distance), then the worst offset is removed from the max-heap and the candidate offset is added to the max-heap; else the candidate offset may be ignored. Additional examples involving multiple offsets per patch are described below with reference to FIG. 3.

Figure 2C:
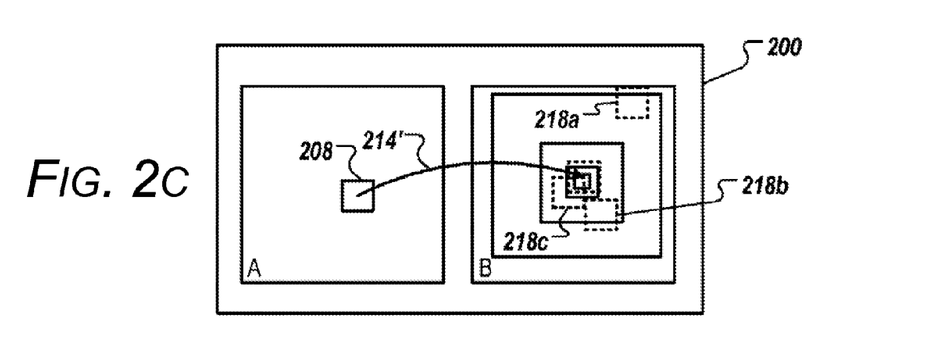

In some situations, the propagation phase may not find the globally best mapping. A perturbation such as a random-search phase can therefore be used as schematically illustrated in FIG. 2C. Here, the patch 208 initially has a mapping 214', for example resulting from the propagation phase. One or more randomly selected mappings can then be evaluated. For example, patches 218A, 218B and 218C can be randomly selected in the image B. In some implementations, the patches 218A-C are selected to have gradually increasing or decreasing distance from the location of the original mapping target in the image B. For example, a random distribution can be used that includes nearby locations (e.g., the patch 218A) and locations further away (e.g., the patch 218C), wherein the distribution places more weight in the distribution function on distances of nearby locations than would be obtained from uniform sampling. In some implementations, an algorithm can sample at uniform from the entire image with probability ½, and sample from a circle with small radius around the current mapping with probability ½, giving a random distribution where smaller distances are preferentially selected, and/or sample according to a Gaussian distribution around the current mapping, to preferentially select smaller distances. As another example, the probability density function can be generally decreasing, meaning that it does not have to be monotonic, but generally decreases as radius increases. In some implementations, the random search can be performed by sampling only those points whose distance is within an exponentially decreasing threshold from the mapping of the first patch. The patches 218A-C can be evaluated to determine whether a better correspondence with the patch 208 can be achieved using a randomly selected patch.

In implementations where k offsets are identified for a patch, perturbation can be performed on each of the k offsets. For example, n samples can be taken with regard to each of the k offsets for the patch; this gives nk samples total. The nk samples can be ranked (e.g., using a max-heap), and when a new candidate offset is considered, the worst element of the heap is discarded if the new candidate has a better patch distance. In some implementations, duplicate patches are eliminated from the nk samples. For example, the offset object S or T (FIG. 1) can include, or can be associated with, a hash table used for eliminating duplicate patches. In some implementations, the hash table or other suitable structure is also or instead used to avoid duplicate samples in the k offsets associated with each patch. Other data structures than hash tables can be used, including, but not limited to, a list.

Figure 2D:
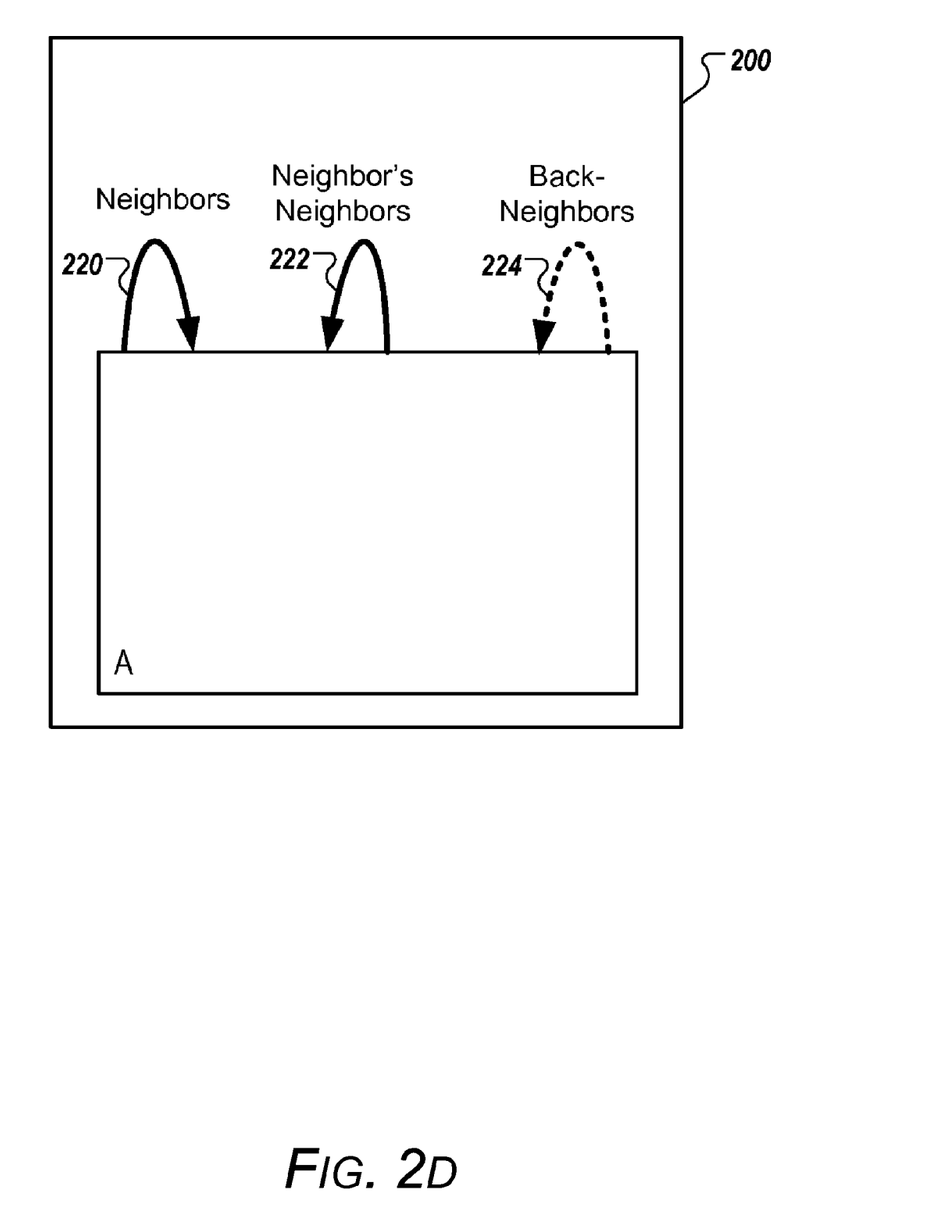

FIG. 2D will be described below.

Figure 3:
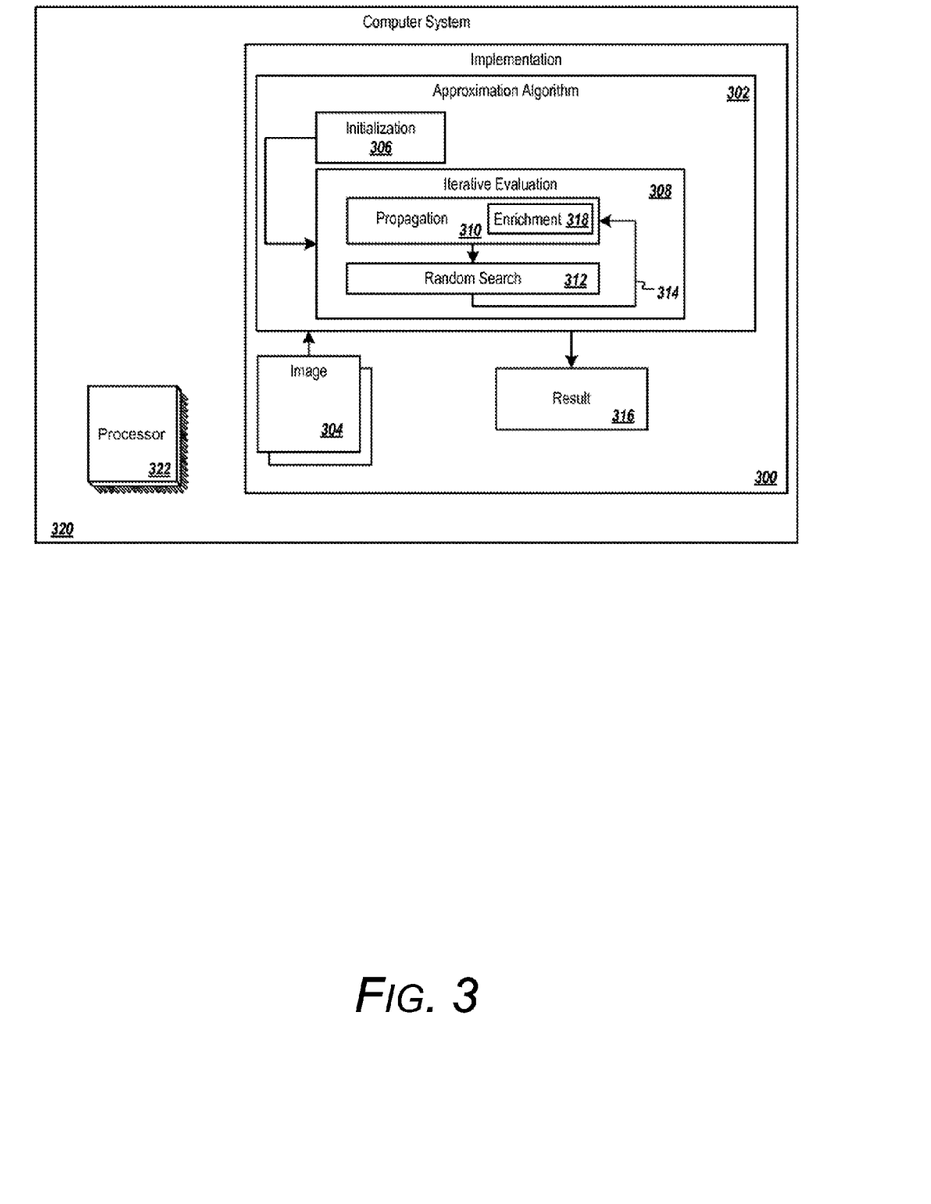
FIG. 3 shows an example implementation wherein iterations of propagation and perturbation a randomized search are performed.

FIG. 3 shows an example implementation 300 wherein iterations of propagation and perturbation are performed, and wherein the perturbation is performed using a randomized search. Here, the implementation 300 includes a randomized approximation algorithm 302. The randomized approximation algorithm 300 can identify, obtain and/or receive images 304 that are to be processed by the algorithm. In some examples, the implementation 300 is configured to determine bi-directional similarity in a synthesis algorithm and find correspondence between image regions, and the image T (FIG. 1) may be somewhat similar to the image S. For example, when used for image retargeting, a gradual resizing of the image S can be performed to produce the image T such that the individual patches of T do not differ dramatically from those of the image S. Alternately, when used for image inpainting or hole filling, the image T can be produced by interpolation of missing region boundaries.

The implementation 300 can include a initialization stage 306 that is performed to define the initial offsets or mappings for patches and/or pixels in at least one of the image 304. In some implementations, the offset objects $O_S$ and $O_T$ (FIG. 1) can be initialized with random offsets in the domains of T and S, respectively. For example, when one offset is identified per patch (i.e., k=1), the chance of any one pixel being assigned the best offset in such an approach can be (1/n), where n is the number of pixels in the image, the likelihood that at least one pixel in the image is assigned the best offset can be $(1-(1-1/n)^n)$. Moreover, the chance that a pixel is assigned an offset close to the correct offset can be $(1-(1-m/n)^n)$, where m is the area of the "close" offset region, for example a circle with a suitable radius. For large images these probabilities can converge to $1-1/e$ and $1-\exp(-m)$, respectively. If the random initialization is used in an implementation where multiple offsets are identified for each patch, this increases the chance that the best offset is among the randomly chosen initial offsets.

Other ways of initializing the offset objects can be used in the initialization 306. In some implementations, seeding can be used. For example, a small number of patch offsets can be initialized using a full k-d tree search to seed the initial estimates with a few pixels guaranteed to be optimal. In some implementations, external and/or manual correspondence can be used. For example, in an image analogy implementation the user may provide labels that constrain the initial guesses to a specific region of the input. In some implementations, a rough initial search can be performed. For example, approximate nearest neighbors can be found using a smaller patch size, such as a single pixel, and/or a reduced-dimensionality patch, and/or a search with a relatively fast distance metric such as $L_2$.

The approximation algorithm 302 can include an iterative evaluation 308. In some implementations, each iteration of the iterative algorithm can involve scanning through each pixel in the image S in a scan order, and the iterative evaluation can be continued until a stopping criterion is reached. The iterative evaluation 308 can include a propagation phase 310 and a phase for perturbing a result of the propagation phase 310, such as a random search phase 312.

In the propagation phase 310, the algorithm can loop through each pixel in the offset object Os, attempting to improve the patch distance between the current patch and the matching patch(es). In implementations that search also among rotations and/or scales of the patches, the patch distance can be expressed as $$D[S(i,j), T(W_S(k,l) \cdot (i,j))]$$

where $W_S$ is a warping matrix being multiplied with the target patch location (i,j) to perform a warping action on the target patch. Then, the propagation phase seeks to determine whether the warping applied to another candidate patch (e.g., in a neighborhood) gives a better result than the current warping.

For example, one can define $$(u,v) \leftarrow \arg\min_{(k,j) \in N(i,j)} D[S(i,j), T(W_S(k,l) \cdot (i,j))]$$

$$W_S(i,j) \leftarrow W_S(u,v)$$

where N is a neighborhood of a particular offset pixel and $W_S(k,l) \cdot (i,j)$ represents the result of applying the warping action of patch (k,l) to the patch (i,j). That is, the propagation phase 310 applies the warping action of other patches (i.e., $W_S(k,l)$) to the present candidate patch (i.e., (i,j)), and the best such warping action (i.e., $W_S(u,v)$) is assigned as the warping action. For simplicity, the warping is here represented as a multiplication (dot product) between the warping object and the candidate patch. It will be understood that some warpings, such as polar transformations, do not involve a multiplication of the candidate patch.

The neighborhood N can be defined in various ways. In some implementations, a fixed spatial neighborhood of the pixel can be searched. For example, the neighborhood can include only the 4 adjacent pixels in the same row or column, or the eight surrounding pixels in the adjacent rows and columns, or the 24 closest pixels in the adjacent two rows and columns on all sides, to name a few examples.

If bidirectional correspondences are desired, then the same can be done for the warping object $W_T$, and optionally "inverse propagation" can also be done, where the algorithm searches through the neighborhood of the pre-image:

$$X(i,j) \leftarrow \{(x,y) | W_T(x,y) \cdot (x,y) = (i,j)\}$$

$$(u,v) \leftarrow \arg\min_{(k,j) \in N(x,y) \forall (x,y) \in N(i,j)} D[S(i,j), T(k,l)]$$

$$W_T(i,j) \leftarrow W_T^{-1}(u,v),$$

where $W_T^{-1}$ is the inverse of the warping function $W_T$.

A perturbation phase, such as the random search phase 312 using random perturbations, can be introduced, for example in an attempt to overcome one or more local minima and to seek convergence to a global optimum in the limit. In some implementations, the random search phase 312 can test a random set of alternate patches in the image T for each offset pixel in $O_S$. In some implementations, the random set can have an arbitrary distribution. In some implementations, however, the random set can be obtained according to a pattern, such as at an exponentially or otherwise decreasing distance from the currently guessed offset:

$$cand(i,j,t) \leftarrow W_S(i,j) + \omega \alpha^{-t}(a,b)$$

$$W_S(i,j) \leftarrow \arg\min_{(k,l) \in cand(i,j,t)} D[S(i,j), T(k,l)]$$

in which $\omega$ can be a fixed large distance (such as the image width), $\alpha$ can be a fixed ratio between search window sizes, and a and b are random variables in a domain, for example [-0.5, 0.5]. In some implementations, $\omega$ can be the larger of image height and width, and $\alpha=2$. The above assignments to the cand variable and $O_S$ can be repeated starting with t=0 and incrementing t until $\omega \alpha^{-t}$ is 1 or less. For example, this can allow the approximation algorithm 302 to jump relatively quickly to distant patch location and then sample more locally in that region.

Thus, in some implementations, the propagation phase 310 can serve to select the best mapping for a given patch/pixel based on what mappings are implied by the neighboring offset pixels. The random search phase 312, in turn, can serve to perturb that mapping selected in the propagation phase 310, for example by randoms of geometrically decreasing size, and then select the best of the random offsets. Accordingly, the iterative evaluation can include an inner loop 314 that runs over each pixel and the propagation phase 310 and the random search phase 312 can be performed in the inner loop 314 over each pixel.

The approximation algorithm 302 can be terminated using one or more stopping criteria. In some implementations, a stopping criterion can be defined by the application in the implementation 300. For example, a fixed number of iterations can be used or the iterations can be performed until the fraction of pixels changed in the offset object(s) is below a threshold. As an example, 5-10 iterations can be used in some implementations.

The approximation algorithm 302 can generate one or more results 316. For example, the result 316 can include the image S (FIG. 1) with the hole 110 filled. As another example, the result 216 can indicate, for at least one patch in the image S (such as the patch 106, FIG. 1), a corresponding at least one patch in the image T (such as the patch 108) that has been identified in the iterative evaluations. In some implementations, the result can reflect a bidirectional similarity between the images 304.

Varying numbers of candidates can be identified for one or more patches. In some implementations, fewer than all k offsets are taken into account in the propagation 310. For example, only the offset with the smallest distance is subjected to propagation. As another example, one or more elements among the k offsets can be randomly chosen for propagation. Similarly, the random search 312 can be performed only for the offset(s) having smallest patch distances, or for one or more randomly chosen offsets. Some implementations perform propagation and/or random search on the m best offsets (with the number m randomly chosen from 1 to k.)

The number k can be changed during iterations. In some implementations, iteration number one can start with $k_0$ number of nearest neighbors, and after a portion of the iterations are completed (e.g., half of them), the number can be increased or decreased to k, the final desired number of nearest neighbors. For example, the worst elements of the heap can be dropped, or uniform random elements can be added. In some implementations, $k_0=k/2$ or $k_0=2k$ can be used.

In some implementations, an enrichment procedure 318 can be performed before the result 316 is generated. Enrichment can seek to propagate good matches across the space of patches themselves, as opposed to propagation across the spatial dimensions of the image. For example, an image A is sometimes matched to itself, such as in non-local-means denoising. In such implementations, patch matching can be performed for regions in a single image, as opposed to in separate images.

In FIG. 2D, for example, the image realm 200 includes only the image A, and the patch-matching task is to match patches in A with patches in A. Here, the algorithm finds one or more matching patches in A for every patch in A. These mappings are here said to represent the neighbors of the respective patches, and are labeled neighbor mappings 220 from A to A. In this nomenclature, the search for neighbors can identify also the current patch itself, so a patch can be considered its own neighbor. Also, each patch identified as a neighbor can itself have one or more neighbors identified as part of the processing, and this is illustrated as neighbor's neighbors mappings 222 from A to A. In a sense, the neighbor's neighbors mappings 222 is the subset of the neighbor mappings 220 for only those patches that are identified as a neighbor in one or more of the neighbor mappings 220. Moreover, a mapping can be defined from each such neighbor patch to every patch that points to the neighbor patch, and this is here illustrated as back-neighbor mappings 224. That is, for an arbitrary patch in A, the back-neighbor mappings 224 point to zero or more patches for which the arbitrary patch is a neighbor. The mappings 220, 222 and/or 224 can be used in enrichment processing, for example as will be described below.

In a sense, if non-enrichment propagation is viewed as moving good matches along a rectangular lattice whose nodes are patch centers (pixels), then enrichment propagation can be viewed as moving good matches along a graph where every node is connected to its k offsets. In some implementations, enrichment of a "forward" type or of an "inverse" type can be used.

In the following examples about enrichment, a multi-valued function $f$ indicates a mapping from a patch position in an image to the patch positions of each of its k nearest neighbors. In forward enrichment, the function $f$ is composited with itself one or more times. As an example, the function $f^2$ can be created by considering all k nearest neighbors of each of the k nearest neighbors for the patch, which gives $k^2$ nearest neighbors of the nearest neighbors. As a nearest neighbor is a candidate patch, the nearest neighbors of the nearest neighbors can be considered candidate patches of the candidate patches, or candidate-candidate patches. From among the k nearest neighbors for the patch and the $k^2$ nearest neighbors for those, the top k matches are taken. In some implementations, higher orders of the function can be used, such as $f^3$, $f^4$, and so forth. A variant of forward enrichment can then be used, for example by taking k random samples from the function $f^n$, or taking the top $$\sqrt[n]{k}$$

elements of $f$.

In inverse enrichment, candidates are produced by reversing pointers to nearest neighbors. As an example, the function $f^{-1}$ represents the multi-valued inverse of the function $f$. That is, for an arbitrary patch a, say in the image T (FIG. 1), the function $f^{-1}$ returns any patch(es) in the image S pointing to the patch a. If no patch in S points to the patch a, then the function $f^{-1}$ has no value for that patch. If the patch distance function is symmetric, such that the distance from patch a to patch b is the same as the distance from patch b to patch a, then patch distances need not be explicitly calculated for the function $f^{-1}$. The function $f^{-1}$ can be stored using a list of varying length at each position. From among the k nearest neighbors for the patch and the neighbors from the function $f^{-1}$, the top k matches are taken. In some implementations, higher orders of the function can be used, such as $f^{-2}$, $f^{-3}$, and so forth. In some implementations, forward enrichment is followed by inverse enrichment, or vice versa. For example, $f^{-1}$ inverse enrichment can be followed by $f^2$ forward enrichment.

The above examples illustrate how enrichment can be viewed as making different numbers of "hops" forwards or backwards the graph. That is, the example $f^2$ forward enrichment corresponds to one "forward" hop in the graph, because it goes from taking into account only the neighbors of a patch to taking into account also the neighbors of those neighbors. The example $f^{-1}$ inverse enrichment, in turn, corresponds to one "backward" hop in the graph, because it considers also all patches that point to a particular neighbor.

In a sense, propagation, random search, use of k nearest neighbors, and enrichment can all be considered heuristics for finding better matches using various hops in image space and patch-appearance-space. Fixed or random sampling can be applied in either space, and arbitrary combinations can be used. For example, propagation can involve fixed sampling in image space plus one fixed hop in appearance space, while random search can involve a random sample over an exponential distribution in image space plus one fixed hop in appearance space. Enrichment, finally, can use a fixed number of hops in appearance space. Analogous to a random-search phase, then, the graph can be randomly sampled in some implementations, for example with higher probability on smaller numbers of hops but some probability of larger numbers of hops in order to escape local minima. Both types of hops can be sampled with an arbitrary distribution.

In some implementations, a generalized algorithm includes components for performing each of the propagation, random search, use of k nearest neighbors, and enrichment phases. Any or all of these components can be invoked based on the circumstances. For example, an algorithm can use the propagation, random search, and enrichment components. As another example, the propagation, use of k nearest neighbors, and enrichment components can be used in an algorithm. Other combinations can be used in some implementations.

Computer processing can involve more than one processor core. The implementation 300 can be practiced in a computer system 320 that has a multi-core architecture. For example, the computer system 320 can have a processor 322 that is a multi-core processor, such as an eight-code processor. As another example, the computer system 320 can have multiple single-core processors.

In a multi-core architecture, a parallel-tiled algorithm can be performed. For example, various aspects of the processing performed in the propagation 310, the random search 312, and/or the enrichment 318 can be distributed over more than one core. In some implementations, the multi-core processing takes into account that resource conflicts can occur when information is shared between adjacent offsets in propagation. For example, in such implementations the offsets in the object S and/or T (FIG. 1) can be divided into horizontal tiles 112 (FIG. 1) to be processed sequentially. Then, the last row of a tile is written back only after the critical section that synchronizes the tiles. As another example, the number of horizontal tiles 112 can be made twice the number of cores (i.e., 2n tiles for n cores), and all even tiles can be processed in parallel, followed by processing of all odd tiles in parallel. In some implementations, vertical tiles or other tiling arrangements can be used.

Figure 4:
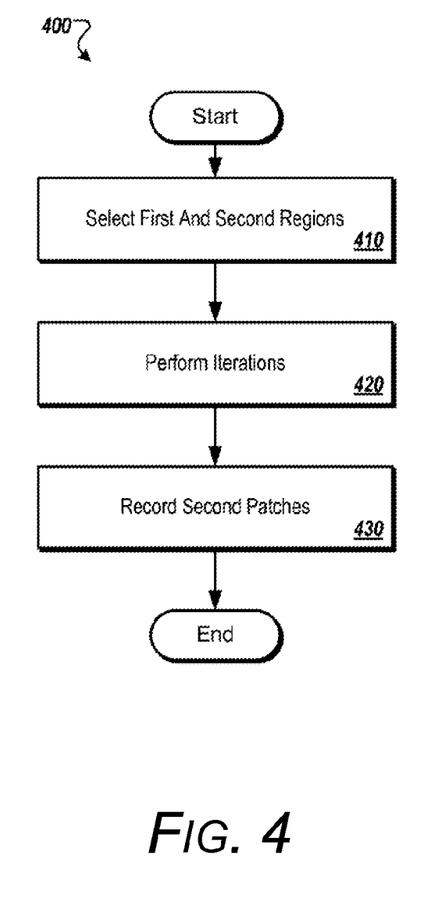
FIGS. 4-6 show flow charts of example methods.
Figure 5:
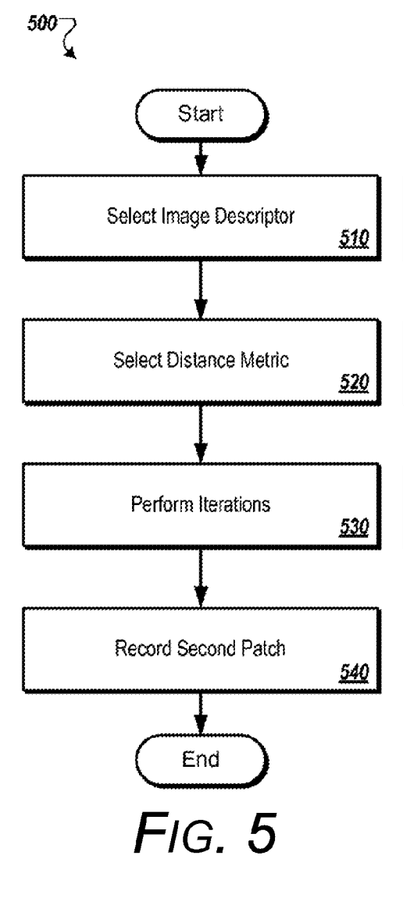
Figure 6:
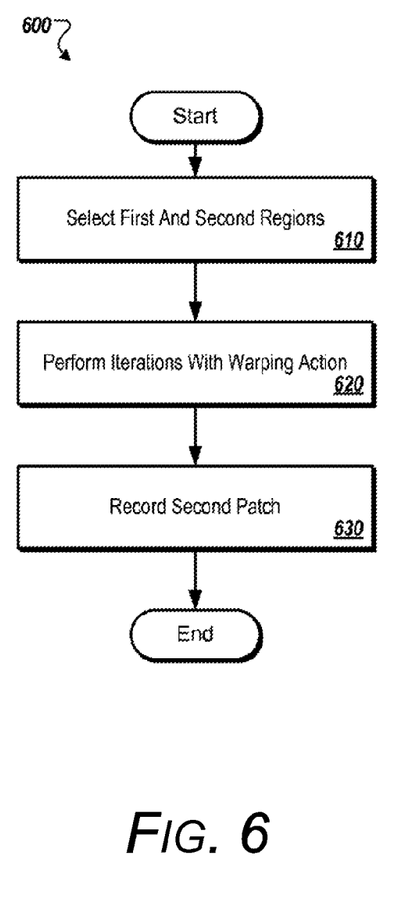

FIGS. 4-6 show flow charts of example methods 400, 500 and 600, respectively. Each of the methods can be performed by a processor executing instructions in a computer-readable medium, for example in the system 100 (FIG. 1) or in the system 320 (FIG. 3). In some implementations, more or fewer steps can be performed; as another example, one or more steps can be performed in a different order.

Beginning with method 400, it relates to determining correspondence between image regions, and step 410 involves selecting first and second regions of visual content including pixels in a computer system. The first region includes a first patch to be mapped to the second region. For example, the regions corresponding to the patch 106, and to one or more of the patches 108A-C, can be selected.

Step 420 involves performing iterations to find mappings for the first patch. The iterations include nearby-pixel mapping evaluation and random-perturbation mapping evaluation. For example, the iterative evaluation 308 (FIG. 3) can be performed.

In step 430, second patches in the second region found using the iterations are recorded. For example, the implementation 300 (FIG. 3) can create the result 316 with k identified patches for each original patch.

Continuing with FIG. 5, the method 500 relates to determining correspondence between image regions using a selected image descriptor and/or distance metric. Step 510 involves selecting an image descriptor for first and second regions in a computer system. The first region includes a first patch to be mapped to the second region. In some implementations, a descriptor of 7×7 patches is used.

In some implementations, object detection can be performed using deformable templates, boosted cascades, matching of sparse features such as scale invariant feature transforms (SIFT), histograms of oriented gradients. For example, implementations can match densely sampled features, including upright patches, rotating or scaled patches, or local region descriptors such as SIFT. These matches are global, so that correspondences can be found even when an object moves across an image, or rotates or scales significantly. Provided that the descriptor is invariant to the change in object appearance, the correct correspondence will be found.

In a particular example of object detection, a template is broken into small overlapping patches. These patches are queried against the target image, searching over all rotations, and a range of scales. A similarity transform is then fit from the template to the target using random sample consensus (RANSAC). Patch distance is calculated using the $L^2$ norm, after correcting for limited changes by normalizing the mean and standard deviation in luminance to be equal. As a result, objects can be found under partial occlusions and at different rotations and scales.

In general, any descriptor can be computed and a distance metric can be defined on that descriptor. For greater invariance to lighting and appearance changes, a more complex local appearance model is needed. For example, suppose that detection is to be performed on photographs of two similar objects with different appearance. One may wish to align the objects, or propagate labels from one image to the other for all similar objects and background. This can be done using SIFT features correspondence on a dense grid combined with an optical-flow like smoothness term. The resulting field is solved using a coarse-to-fine approach and global optimization (belief propagation). Some implementations densely sample SIFT descriptors, for example at every pixel, and match these.

Step 520 involves selecting a distance metric for evaluating mappings for the first patch. For example, the distance metric can be selected from the $L^2$ norm; a modified $L^2$ distance that involves correction for limited changes in lighting by normalizing the mean and standard deviation in luminance to be equal; or any other algorithm that supplies a total ordering, with the implicit assumption that patches with close spatial proximity should also be more likely to have similar offsets for their best nearest-neighbors.

In step 530, iterations are performed to find the mappings for the first patch, the iterations including nearby-pixel mapping evaluation and random-perturbation mapping evaluation. The iterations use the selected image descriptor and the selected distance metric. For example, the iterative evaluation 308 (FIG. 3) can be performed.

Step 540 involves recording at least one second patch in the second region found using the iterations. For example, the result 316 (FIG. 3) can be recorded.

Turning now to the method 600, it relates to determining correspondence between image regions using one or more warping actions. For example, the warping can involve one or more of scaling, rotation, transformation, homography, and combinations thereof. Step 610 involves selecting first and second regions of visual content including pixels in a computer system, the first region comprising a first patch to be mapped to the second region. For example, the regions corresponding to the patch 106, and to one or more of the patches 108A-C, can be selected.

In step 620, iterations are performed to find mappings for the first patch, the iterations including nearby-pixel mapping evaluation and random-perturbation mapping evaluation. A warping action is performed on the candidate patch in at least one of the iterations. For example, the patch 108B and/or the patch 108C (FIG. 1) can be used.

Step 630 involves recording at least one second patch in the second region found using the iterations. For example, the result 316 (FIG. 3) can be recorded.

Some statistical analysis experiments were performed on many pairs of images, in which it was measured how nearest-neighbor offsets are distributed in natural image pairs. In these experiments, the outcomes of propagation and random-search steps roughly correspond to the peaked exponential distributions of offsets that had previously been observed: the distribution of the current pixel offset around the offset of its immediate neighbor, as well as the distribution of nearest-neighbors that are better than the previous offset around the that offset.

The distributions changed locally when they were conditioned on some properties of the current pixel. For example, the distributions became narrow (tight) around the previous offset as the previous patch distance was decreased. This observation is consistent with the notion that the closer one is to the best nearest-neighbor, the more narrow one's search window for the next samples can be. So if one has a limited "budget" of samples it could be more useful to spend most of them on nearby offsets.

Another useful conditioning that was observed relates to the local structure of the patch. For example, for a patch that sits on a horizontal edge, the measured distribution was an elongated exponential function along the direction of the edge. Similarly, this observation is consistent with the notion that if an edge patch finds a reasonable nearest neighbor (probably also an edge patch), then a better nearest neighbor is likely to be found in the rough direction of the edge.

Accordingly, the sampling pattern in a random-search step can change locally (instead of a fixed pattern) to adapt locally to some properties of the patch. Examples of patch properties include: the distance at the previous patch-matching iteration, the local structure of the patch (e.g., each patch can be classified as one of several structures, such as a blob, a horizontal edge, a vertical edge, a uniform region, by convolving with some filters), and the local color of the patch and other local properties.

In some implementations, the number of hops in an enrichment phase can be handled in an analogous way. A fixed distribution, or an adaptively changing distribution, can be used. The distribution can be adapted using a local property, such as the previous patch distance (based on the notion that the closer one is to the true nearest neighbor, the fewer hops one should make).

Fixed (non-adaptive) distributions could probably be learned offline and then be better fitted to the input image at hand. Learning could be done, for example, using similar images (in an image collection of some event) or images of the same class if that knowledge is given (for example indoor images, or images of a particular sport event). Distributions could also be learned from the input image itself, for example if an offline preprocessing is done.

Some portions of the detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output.

The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computing system, comprising:
    a memory configured to store images that are comparable to determine corresponding image patches of the images;
    a processing system to implement an approximation algorithm that is configured to:
        for multiple image patches in a region in a first image, determine corresponding image patches in a second image;
        perform iterations utilizing a nearby-pixel mapping evaluation and a random-perturbation mapping evaluation to determine and select the corresponding image patches in the second image; and
        perform a geometric warping action on at least one of the corresponding image patches in at least one of the iterations, the geometric warping action performed as at least a translation and an additional action, or as the geometric warping action without the translation.

2. The computing system as recited in claim 1, wherein the approximation algorithm is configured to perform the iterations utilizing the nearby-pixel mapping evaluation and the random-perturbation mapping evaluation on a subset of the corresponding image patches that are determined in the second image.

3. The computing system as recited in claim 2, wherein the approximation algorithm is configured to randomly select the subset of the corresponding image patches.

4. The computing system as recited in claim 1, wherein the approximation algorithm is configured to:

utilize patch distances from the multiple image patches in the region of the first image to perform the iterations to determine the corresponding image patches in the second image;

determine whether one of the corresponding image patches determined from the iterations has a smaller patch distance from one of the image patches than one of k patches that has a greatest patch distance in a data structure of the k patches; and if so, remove the image patch that has the greatest patch distance from the data structure, and add the corresponding image patch to the k patches in the data structure.

5. The computing system as recited in claim 4, wherein the approximation algorithm is configured to eliminate duplicate corresponding image patches from the k patches before determining the patch distances.

6. The computing system as recited in claim 4, wherein:
the random-perturbation mapping evaluation includes selecting n sample patches for each of the k patches in the data structure, for a total of nk sample patches; and
the approximation algorithm is configured to eliminate duplicate corresponding image patches from the nk sample patches before determining the patch distances.

7. The computing system as recited in claim 1, wherein the approximation algorithm is configured to randomly select k patches in the second image for use in an initial one of the iterations.

8. The computing system as recited in claim 1, wherein the approximation algorithm is configured to:
retain all of the corresponding image patches determined by the nearby-pixel mapping evaluation and the random-perturbation mapping evaluation; and
record a subset of the retained corresponding image patches having a smallest patch distance.

9. The computing system as recited in claim 1, wherein the approximation algorithm is configured to:
select an image descriptor for the first and second regions;
select a distance metric to evaluate mappings for the first patch; and
wherein the iterations use the selected image descriptor and the selected distance metric.

10. The computing system as recited in claim 1, wherein the geometric warping action includes at least one of a rotation, a scaling, and a homography of the at least one corresponding image patch.

11. A computing system, comprising:
a memory configured to store images that are comparable to determine corresponding image patches of the images;
a processing system to implement an approximation algorithm that is configured to:
for multiple image patches in a region in a first image, determine corresponding image patches in a second image based on a distance metric;
perform iterations utilizing a nearby-pixel mapping evaluation and a random-perturbation mapping evaluation to determine and select the corresponding image patches in the second image, the iterations based on the distance metric and patch distances from the multiple image patches in the region of the first image to the corresponding image patches in the second image;
determine whether one of the corresponding image patches determined from the iterations has a smaller patch distance from one of the image patches than one of k patches that has a greatest patch distance in a data structure of the k patches; and if so, remove the image patch that has the greatest patch distance from the data structure, and add the corresponding image patch to the k patches in the data structure.

12. The computing system as recited in claim 11, wherein the approximation algorithm is configured to eliminate duplicate corresponding image patches from the k patches before determining the patch distances.

13. The computing system as recited in claim 11, wherein:
the random-perturbation mapping evaluation includes selecting n sample patches for each of the k patches in the data structure, for a total of nk sample patches; and
the approximation algorithm is configured to eliminate duplicate corresponding image patches from the nk sample patches before determining the patch distances.

14. The computing system as recited in claim 11, wherein the approximation algorithm is configured to randomly select k patches in the second image for use in an initial one of the iterations.

15. The computing system as recited in claim 11, wherein the approximation algorithm is configured to:
retain all of the corresponding image patches determined by the nearby-pixel mapping evaluation and the random-perturbation mapping evaluation; and
record a subset of the retained corresponding image patches having a smallest patch distance.

16. A computing system, comprising:
a memory configured to store images that are comparable to determine corresponding image patches of the images;
a processing system to implement an approximation algorithm that is configured to:
for multiple image patches in a region in a first image, determine corresponding image patches in a second image;
utilize heuristics to map the multiple image patches of the first image to the second image, the heuristics including enrichment to increase a collection of mapping candidates and at least one of a nearby-pixel mapping evaluation and a random-perturbation mapping evaluation, where the enrichment includes determining the corresponding image patches in the second image along a graph where every node is connected to its k offsets;
perform iterations using the selected heuristics to determine the corresponding image patches in the second image that correspond to the multiple image patches in the region of the first image.

17. The computing system as recited in claim 16, wherein the enrichment heuristic to increase the collection of the mapping candidates includes one of a forward-type enrichment heuristic or an inverse-type enrichment heuristic.

18. The computing system as recited in claim 16, wherein the enrichment heuristic to increase the collection of the mapping candidates utilizes a fixed number of hops in a patch-appearance-space to randomly sample the second image.

19. The computing system as recited in claim 16, wherein the approximation algorithm is configured to:
utilize patch distances from the multiple image patches in the region of the first image to perform the iterations to determine the corresponding image patches in the second image;
determine whether one of the corresponding image patches determined from the iterations has a smaller patch distance from one of the image patches than one of k patches that has a greatest patch distance in a data structure of the k patches; and if so, remove the image patch that has the greatest patch distance from the data structure, and add the corresponding image patch to the k patches in the data structure.

20. The computing system as recited in claim 16, wherein the approximation algorithm is configured to:

retain all of the corresponding image patches determined using the selected heuristics; and record a subset of the retained corresponding image patches having a smallest patch distance.

* * * * *